US010079880B2

(12) United States Patent
Murphy et al.

(10) Patent No.: US 10,079,880 B2
(45) Date of Patent: Sep. 18, 2018

(54) AUTOMATIC IDENTIFICATION OF INVALID PARTICIPANTS IN A SECURE SYNCHRONIZATION SYSTEM

(71) Applicant: Apple Inc., Cupertino, CA (US)

(72) Inventors: Richard F. Murphy, Boulder Creek, CA (US); Yannick L. Sierra, San Francisco, CA (US); Andrew R. Whalley, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 327 days.

(21) Appl. No.: 14/871,210

(22) Filed: Sep. 30, 2015

(65) Prior Publication Data

US 2016/0359965 A1    Dec. 8, 2016

Related U.S. Application Data

(60) Provisional application No. 62/172,124, filed on Jun. 7, 2015.

(51) Int. Cl.
*H04L 29/08* (2006.01)
*H04L 29/06* (2006.01)

(52) U.S. Cl.
CPC ...... *H04L 67/1044* (2013.01); *H04L 63/0428* (2013.01); *H04L 67/1095* (2013.01); *H04L 67/22* (2013.01); *H04L 63/065* (2013.01); *H04L 63/104* (2013.01)

(58) Field of Classification Search
CPC .................................................. H04L 67/1044
See application file for complete search history.

(56) References Cited

U.S. PATENT DOCUMENTS

| 6,732,144 | B1 | 5/2004 | Kizu et al. |
| 7,231,461 | B2 | 6/2007 | Laschkewitsch et al. |
| 7,561,694 | B1 * | 7/2009 | Chakrabarti ......... H04L 9/0822 380/270 |
| 9,077,759 | B2 | 7/2015 | Brouwer et al. |
| 2007/0271234 | A1 | 11/2007 | Ravikiran |

(Continued)

FOREIGN PATENT DOCUMENTS

| EP | 1633079 | 3/2006 |
| WO | PCT/US2016/035925 | 6/2016 |

OTHER PUBLICATIONS

International Search Report and Written Opinion for PCT/US2016/035925, dated Aug. 3, 2016, Apple Inc.

*Primary Examiner* — Kambiz Zand
*Assistant Examiner* — Thanh Le
(74) *Attorney, Agent, or Firm* — McDermott Will & Emery LLP

(57) ABSTRACT

A method of identifying invalid participants in a synchronization group. The method generates a device synchronization group identifier (DSGI) for a first device from a device-specific key of the first device. The method joins the first device in the synchronization group by using the DSGI of the first device. Prior to the joining of the first device, the synchronization group stores a set of DSGIs of a set of devices that have joined the synchronization group. The method determines that a particular DSGI stored in the synchronization group is the same as the DSGI of the first device. The method identifies the particular DSGI stored in the synchronization group as a DSGI of an invalid participant of the synchronization group.

24 Claims, 13 Drawing Sheets

(56) References Cited

U.S. PATENT DOCUMENTS

| | | |
|---|---|---|
| 2009/0055464 A1 | 2/2009 | Multer et al. |
| 2009/0158041 A1 | 6/2009 | Kang et al. |
| 2011/0072274 A1 | 3/2011 | Leoutsarakos et al. |
| 2011/0252243 A1 | 10/2011 | Brouwer et al. |
| 2012/0155643 A1* | 6/2012 | Hassan ............... H04L 9/083 380/270 |
| 2012/0290730 A1 | 11/2012 | Desai et al. |
| 2013/0042313 A1* | 2/2013 | Lambert ............ H04L 63/065 726/7 |
| 2013/0185373 A1 | 7/2013 | Vandwalle et al. |
| 2014/0273854 A1 | 9/2014 | Breckman et al. |
| 2014/0281540 A1 | 9/2014 | Brouwer et al. |
| 2015/0026125 A1 | 1/2015 | Sharma |
| 2015/0222615 A1 | 8/2015 | Allain et al. |

* cited by examiner

AUTOMATIC IDENTIFICATION OF INVALID PARTICIPANTS IN A SECURE SYNCHRONIZATION SYSTEM

CLAIM OF BENEFIT TO PRIOR APPLICATIONS

This application claims the benefit of U.S. Provisional Patent Application 62/172,124, filed Jun. 7, 2015. U.S. Provisional Patent Application 62/172,124 is incorporated herein by reference.

BACKGROUND

Synchronization systems allow secure synchronization of data items among a number of devices without a central authority being able to gain access to the data items. A common way for a device to identify itself to others in the synchronization system is by using a public/private key pair, the private key of which is only kept on the device.

Over time, the set of devices that participate in synchronization may have a number of "ghosts" or non-participant members. These are devices that are valid members of the synchronization system that have lost their private key, making it impossible for them to participate again. One class of non-participant members is caused by devices that are members of the synchronization system and are erased and re-introduced back into the synchronization system. This could be because the owner selected to erase all contents and settings on a device (e.g., to lend the device to a family member temporarily), or replaced the device's hard drive and decided to start afresh rather than restoring from a backup.

Non-participants cause performance and power issues, as other devices in the synchronization system continue to try to synchronize items with them. Non-participants might also clutter up management user interfaces and even cause a security problem. For instance, the owner of a device may become used to seeing old devices that are not used anymore being displayed alongside with the active devices. The owner might become less able to spot an attacker's device should one make its way into the synchronization system.

BRIEF SUMMARY

Some embodiments provide a novel method of removing non-participant members from a synchronization group without revealing the identity of the individual devices to other devices in the synchronization group or to entities outside the synchronization group. Each device has a public and private key pair and uses the public key to join the synchronization group. The public key of the device is stored in a storage associated with the synchronization group and is used to identify the device to other members of the group.

When a device is reconfigured, the public and private keys are erased from the device storage and the device can no longer participate in the synchronization group. The public key of the device, however, remains in the storage associated with the synchronization group and the other members of the synchronization group still will try to synchronize their data items with the device.

In some embodiments, each device in the synchronization group uses an additional identifier to identify the device as a member of the group. In some embodiments, the device synchronization group identifier is a symmetric signature such as message authentication code (or message digest). In some embodiments a key derivation function is used to generate a cryptographic key from a device-specific identifier. A cryptographic function then receives the cryptographic key as input and generates the device synchronization group identifier. Since the identifier is generated from a device-specific identifier, it is unique to each device. The identifier is also persistent in each device and is not erased or can be re-generated from the same device-specific identifier.

Since the identifier is encrypted, the other members of the synchronization group and entities outside the group cannot track the identifier to any specific physical device. The device synchronization group identifier is generated in such a way that it is only possible to decrypt, verify, or derive the identifier with the knowledge of a hardware secret or a secret that is deterministically derived from hardware which persists over erase and restore operations. The requirement is for the identifier to be indistinguishable from a random number (even when the device identifier key is known) so that it can't be used to track a device in the event that the device public identifier is changed.

When a device is reconfigured, a new public and private key pair is created for the device. The device rejoins the synchronization group by using the new public key of the device and the encrypted identifier of the device that is the same as the previous encrypted identifier used by the device to join the synchronization group. Once the device joins the synchronization group, the device compares the encrypted identifiers of other members of the synchronization group with its own encrypted identifier. If there is a match, the device determines that the matched encrypted identifier and the associated public key are its own encrypted identifier and public key form a previous membership in the group. Since the device has erased the private key associated with old public key, the device removes the old public key and any information associated with the old key from the synchronization group. Since the public key of the device is changed, without the use of the unique encrypted identifier, it would not have been possible for the device to recognize its own old public key and remove it from the synchronization group.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
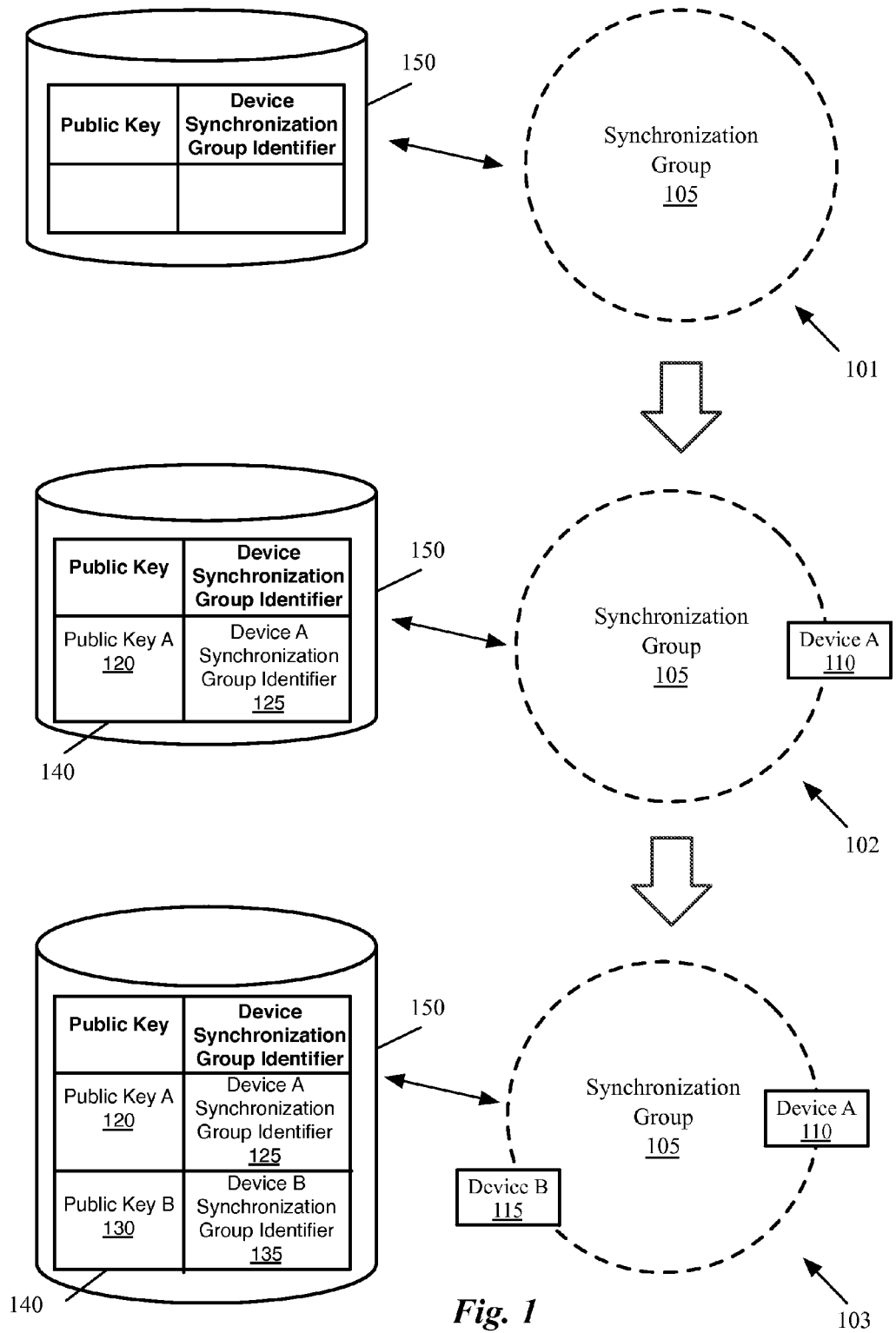
FIG. 1 conceptually illustrates an example of starting a synchronization group and adding devices to the synchronization group according to some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed. For instance, many of the figures in this application are described with respect to a particular number of devices for the purposes of simplicity and/or explanation. One of ordinary skill in the art will realize the invention is not limited to the number of devices illustrated in these figures and that the invention may be practiced with any number of different devices.

Some embodiments provide a method of identifying invalid participants in a synchronization group (also referred to as a synchronization circle or a sync circle). In some embodiments, each device in the synchronization group uses an identifier to identify the device as a member of the group. In some embodiments, the device synchronization group identifier is a symmetric signature such as message authentication code. In some embodiments a key derivation function is used to generate a cryptographic key from a device-specific identifier. A cryptographic function then receives the cryptographic key as input and generates the device synchronization group identifier. Since the identifier is generated from a device-specific identifier, it is unique to each device. The identifier is also persistent in each device and is not erased or can be re-generated from the same device-specific identifier.

For instance, a cryptographic key is derived in some embodiments from a device specific identifier, such as media access control (MAC) address or unique device identifier (UDID). The derived cryptographic key is then used as the key for calculation of an encrypted identifier (or key) for the device to join the synchronization group identifier. This "device synchronization group identifier" is used to identify the device and is stored in the synchronization system (e.g., in a storage accessible by all member devices and/or in storage of individual member devices) without any of the privacy issues of directly using a hardware identifier of the device (e.g., because the encrypted identifier is calculated with a one-way function). In addition, in some embodiments, the device synchronization group identifier is used to sign the public key (or any other ephemeral property of the device's current instantiation) that is used by the device to join the synchronization group.

When a device with a newly created public/private key pair joins the synchronization system, the device compares the device synchronization group identifier of other members with its own device synchronization group identifier. If the device synchronization group identifiers match, then the new device determines that the matched device synchronization group identifier and the associated public key are its own device synchronization group identifier and public key form a previous membership in the group. The device then retires the old public key (e.g., the device deletes the old public key from the storage associated with the synchronization group or informs the other group members to delete the old public key from the storage that the other devices maintain for the synchronization group).

FIG. 1 conceptually illustrates an example of starting a synchronization group and adding devices to the synchronization group according to some embodiments of the invention. The figure illustrates three stages 101-103 of registering two devices into the synchronization group 105. Each of the stages 101-103 shows a conceptual depiction of the synchronization group 105 and a storage 150 that stores data for the synchronization group 105. In some embodiments, the storage 150 is implemented in a cloud storage service as described in more detail below. In some embodiments, each device that is a member of the synchronization group 105 (in lieu of or in addition to the cloud storage service) stores a copy of the data in a storage 150 locally on the device. For simplicity, FIG. 1 and several other exemplary figures described below show storage 150 as a single storage although the storage may be kept individually on each group member device.

The first stage 101 illustrates the synchronization group 105 with no devices registered into the synchronization group 105. As shown, the synchronization group 105 is empty and the storage 150 contains no data regarding members of the synchronization group. The synchronization group 105 in some embodiments is linked to a cloud storage service account and devices associated with the cloud storage service account (e.g., devices that have an application or program for accessing the cloud storage associated with the account) are candidates for registering into the synchronization group 105. The storage 150 in some such embodiments stores metadata describing the devices associated with the account.

In some embodiments, the synchronization group 105 does not actually exist when the synchronization group 105 is empty. The synchronization group 105 is created in some such embodiments when a first device registers into the synchronization group 105. When one of the devices associated with the cloud storage service account enables a keychain synchronization feature on the device, the device creates the synchronization group 105 and registers itself into the synchronization group 105.

The second stage 102 shows the synchronization group 105 after a device 110 has registered into the synchronization group. As shown in the second stage 102, device A 110 is registered into the synchronization group 105 and the storage 150 is storing data identifying device A as a member of the synchronization group 105. To register into the synchronization group, device A stores the encrypted device synchronization group identifier 125 in the storage 150 to uniquely identifies device A as a member of the synchronization group 105 without revealing the actual identity of the device. The device also stores an encryption key such as a public key 120 of the device in the storage 150.

In some embodiments, each device that is in the synchronization group 105 or may potentially join the synchronization group 105 uses a public-key cryptography algorithm (e.g., an RSA algorithm, an elliptic curve cryptography (ECC) algorithm, etc.) to generate the device public/private key pair. When a device intends to identify itself to other devices, the device uses its own private key to sign a message that is sent to other devices. The other devices use the public key of the device to decrypt the messages to verify the identity of the device. Each device generates in some embodiments a device signing public/private key pair randomly. This way, each device generates a unique device signing public/private key pair that is different from the device signing public/private key pairs generated by any other device.

In some embodiments, when a device intends to send a secure message to another device in the synchronization group to synchronize data, the two devices establish a secure communication channel using a message-based communication protocol (e.g., off-the-record (OTR) messaging). Other embodiments, establish a secure communication channel between each pair of devices using a stream-based communication protocol (e.g., secure sockets layer (SSL)). Further details for establishing a secure communication channel between each pair of devices in a synchronization group are described below.

The device synchronization group identifier 125 is also unique for each device. Each device uses the corresponding encrypted device synchronization group identifier to identify the device in the synchronization group. It should be understood that the device synchronization group identifier is only verifiable by the device which generated the identifier since that is the only device that has the required key (which is derived from hardware secrets) to do so. In other words, each device can use the corresponding device synchronization group identifier to only identify itself.

The use of persistent and unchangeable hardware identifiers such as media access control (MAC) address or unique device identifier (UDID) causes privacy problems. Such hardware identifiers can be used to track a device across multiple accounts and multiple owners. As described in further detail below, some embodiments use a hardware unique identifier to derive a cryptographic key. The cryptographic key can be derived from a device specific identifier (such as the UDID) or from another hardware identifier via a key derivation function. The derived key is then used as the key to calculate a unique encrypted identifier (such as the device synchronization group identifier 125) for the device. The encrypted identifier is persistent in the device and is not erased or can be re-generated from the same device-specific identifier.

This device synchronization group identifier is stored in the synchronization group without any of the privacy issues of using the hardware identifier directly. Since device A 110 is the first device registered into the synchronization group 105, device A stores the public key 120 and the device synchronization group identifier 125 of the device 110 in the storage 150. For instance, the public key 120 and the device synchronization group identifier 125 are stored in a table 140 in storage 150.

The third stage 103 illustrates another device registered into the synchronization group 105. As shown, device B 115 has joined the synchronization group 105. The storage 150 stores the public key 130 and the device synchronization group identifier 135 of device 115. Once device A and device B are members of the synchronization group 105, data (such as keychain data) of the two devices are synchronized.

In order for device B to register into the synchronization group 105, some embodiments require (1) that device B submit a request to join the synchronization group 105 by storing the request in the storage 150 and (2) that device A approve of the request. Different embodiments define different requirements to approve a request to join a synchronization group. For instance, some embodiments require only one device that is a member of the synchronization group to approve of the request while other embodiments require every device that is a member of the synchronization group to approve of the request.

Several more detailed embodiments of the invention are described in the sections below. Section I describes identifying and removing non-participant members of a synchronization group. Next, Section II describes sets of devices that use multiple verification sub-groups and synchronization sub-groups, while Section III conceptually describes details of example P2P network architectures according to some embodiments of the invention. Finally, Section IV describes an electronic system that implements some embodiments of the invention.

I. Removing Non-Participants from a Synchronization Group

Figure 2:
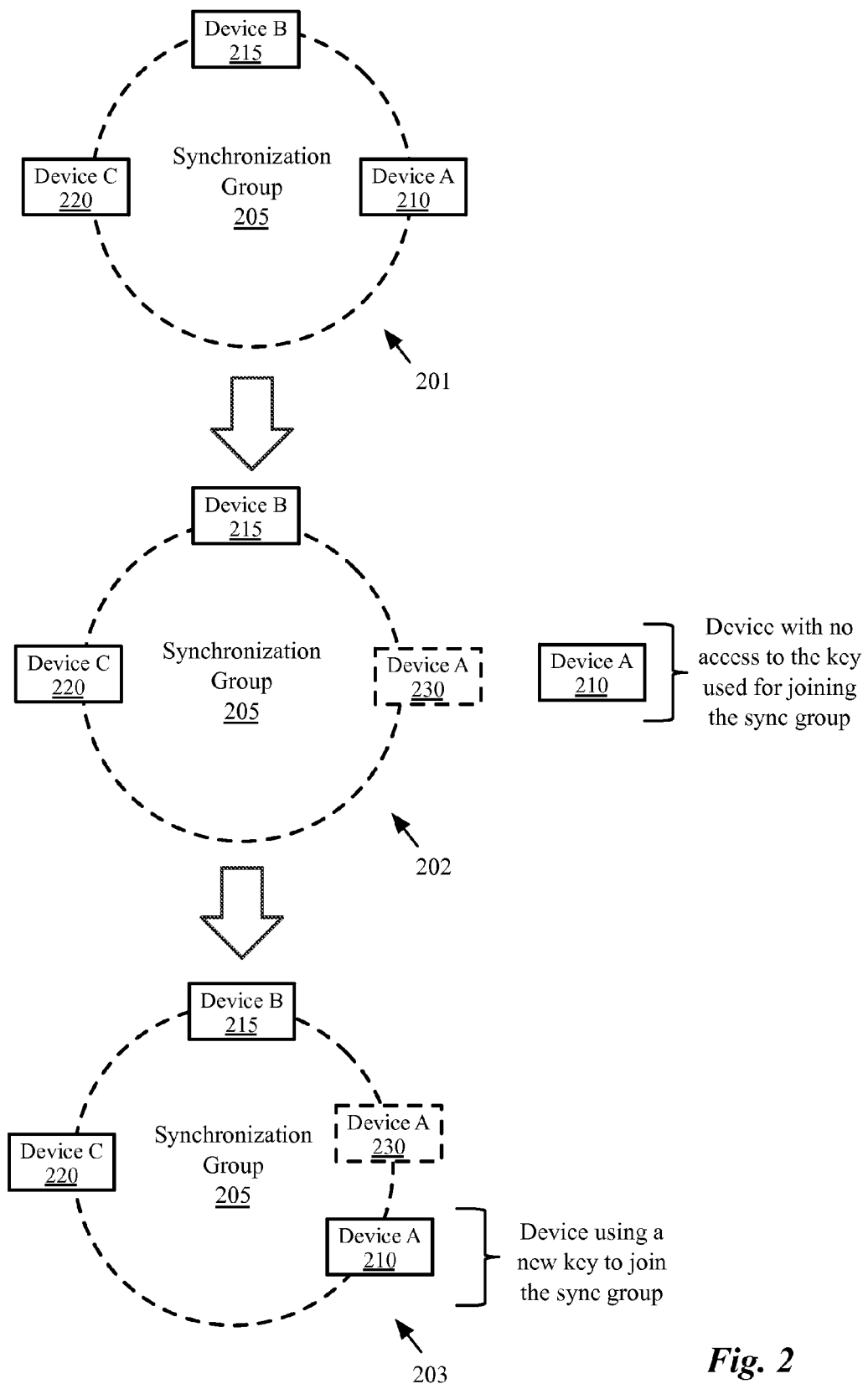
FIG. 2 conceptually illustrates an example of a synchronization group that loses a device.

As mentioned, non-participants may be an issue when the key(s) used by a device to join a synchronization group and identify itself in that synchronization group are erased, while the synchronization group still believes that the device is a valid member of the group. This may occur even after the device has re-joined the group with a new set of keys. FIG. 2 conceptually illustrates an example of a synchronization group 205 that loses a device. The figure is shown in three stages 201-203. In stage 201 three devices 210-220 are members of the synchronization group 205. In stage 202, the public/private key pair of device A 210 is erased. For instance, the hard drive of device A is replaced without restoring a backup or the public/private key is deliberately erased.

As shown, although device A 210 has lost its private key associated with the public key and cannot use the public key to access the synchronization group 205, a copy of the public key is still stored in the synchronization group (e.g., in a storage accessible by all member devices and/or in storage of individual member devices). This is conceptually shown as a dashed box 230 to indicate that the other members of the synchronization group still consider device A as a member and try to synchronize data items with device A.

In stage 203 device A rejoins the synchronization group. For instance, device A creates a new public/private key pair and uses the new public key to join the synchronization group 205. As shown, although device A 210 has rejoined the synchronization group, all group members including device A 210 will still try to synchronize with the "ghost" 230 of device A since the old public key of device A is still stored in the synchronization group.

Figure 3:
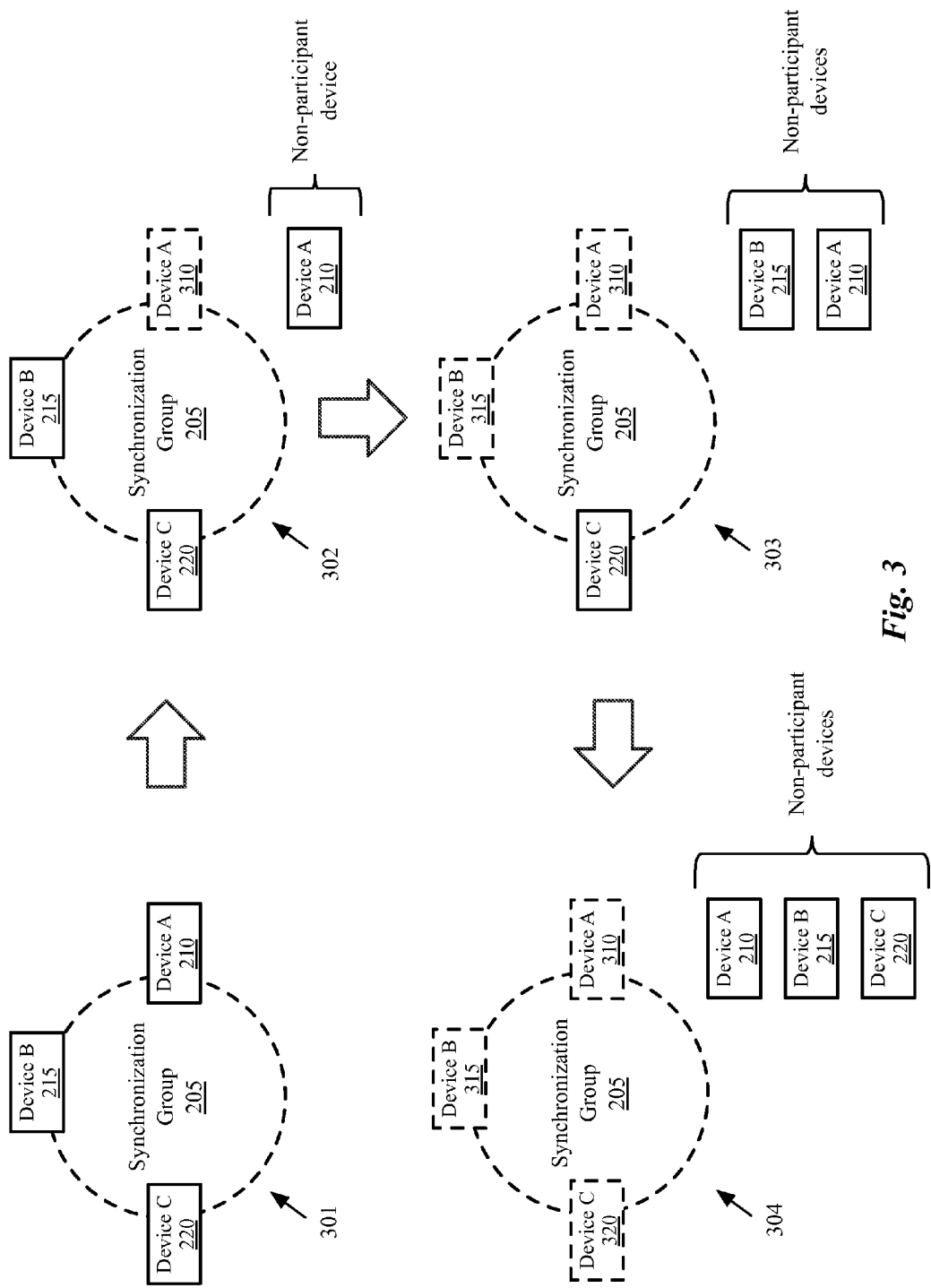
FIG. 3 conceptually illustrates a synchronization group where over time all participating devices have lost the private key associated with the public key that was used to join them in the synchronization group.

FIG. 3 conceptually illustrates a synchronization group where over time all participating devices have lost the private key associated with the public key that was used to join them in the synchronization group. The figure is shown in four stages 301-304. Stage 301 is similar to stage 201 in FIG. 2 where three devices 210-220 are members of the synchronization group 205. In stage 302, the public/private key pairs that were used by the device 210 to join the group are erased. For instance, the hard drive of the device is replaced without restoring from a backup. As a result, although device A 210 has lost the private key associated with its public key and cannot use the public key to access the synchronization group 205, a copy of the public key is still stored in the synchronization group (e.g., in a storage accessible by all member devices and/or in storage of individual member devices). This is conceptually shown as a dashed box 310 to indicate that the other members of the synchronization group still consider device A as a member and try to synchronize data items with it.

In stage 303, device 215 becomes a non-participant. For instance, device 215 is lost or retired. As a result, the synchronization group 205 in stage 303 only one valid participant 220. Other members 310 and 315 of the group are non-participant (or invalid) members.

In stage 304, device C 210 also becomes a non-participant. For instance, some systems require a device to maintain a certain security level (e.g., a certain number of characters in a password, etc.) in order to be a member of a synchronization group. A device that meets the security level criteria can join the synchronization group. If at a later time, the device no longer meets the security criteria (e.g., the device changes the password to include fewer than the required number of characters), the device is automatically excluded from the synchronization group. As a result, the synchronization group in stage 304 only includes non-participants 310-320. Since none of the member devices can access the synchronization group and approve new devices to join the group, no devices can join the group. The synchronization group 205 has to be deleted (or left inaccessible) and a new synchronization group has to be started.

Figure 4:
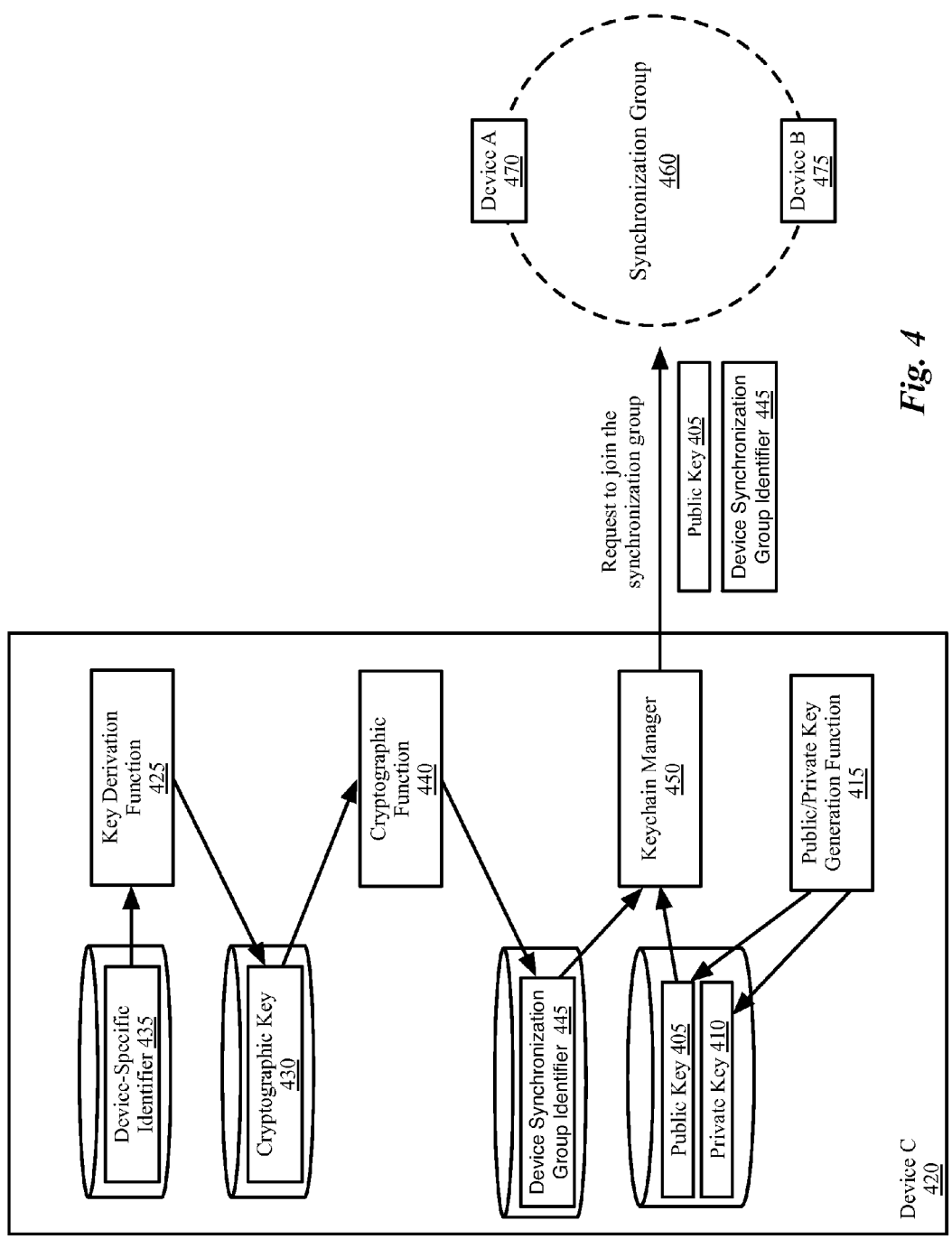
FIG. 4 conceptually illustrates using a public key and a device synchronization group identifier for joining a device in a synchronization group in some embodiments of the invention.

As described above, devices that are members of a synchronization group use a public key as well as a device synchronization group identifier to join the synchronization group. FIG. 4 conceptually illustrates using a public key and a device synchronization group identifier for joining a device in a synchronization group in some embodiments of the invention. As shown, the device 420 generates a public Key 405 and private key 410 using a public/private key generation function 415 such as an RSA algorithm, an elliptic curve cryptography (ECC) algorithm, etc. In some embodiments a new public/private key pair is generated when the device is rest, the existing public/private key pair is deliberately erased, or when the device hard drive is replaced without restoring the contents from a backup.

The device also generates a unique identifier that is used to identify the device as a member of the synchronization group but cannot be used to identify the particular device to other devices in the synchronization group or to entities outside the synchronization group. For instance, the identifier can be used to identify a device as the device with identifier "abc" or as member number 5 of the synchronization group but not as Joe's cell phone, or the device with media access control (MAC) address "03:0b:96:7d:68:12", or the device with a particular unique device identifier (UDID). In other words, the identifier can only be used to identify the device in the synchronization group but cannot be mapped to an actual physical device that can be tracked and identified. The use of an unencrypted persistent and unchangeable hardware identifier causes privacy problems, as they can be used to track a device across multiple accounts and multiple owners.

In the example of FIG. 4, a key derivation function 425 is used to generate a cryptographic key 430 from a device-specific identifier 435 (such as the MAC address or the UDID). Since the MAC address is exposed through Internet traffic, it does not alone fulfill the requirement for the device-specific hardware key. However, the MAC address can be used in the derivation of the UUID (which is unique to a device) or group identifier (GID) (which is shared among a category of products).

In some embodiments, the device specific identifier 435 is a high entropy key seed that is computationally prohibitive to be found by trial and error. A cryptographic function 440 such as a hash-based cryptographic function is used to generate the device synchronization group identifier. In some embodiments, the device synchronization group identifier is a message authentication code (or message digest). In some embodiments, the cryptographic function 440 is a hash-based cryptographic function, such as security hash algorithm 1 (SHA-1), that receives the cryptographic key 430 as input (the input is sometimes is referred to as a message) and generates an output (referred to as hash value or message digest) in such a way that it is practically impossible to recreate the input data from the hash value. Some embodiments use other techniques to provide the input to the cryptographic function 440. For instance, some embodiments do not utilize a key derivation function 425 and directly provide the device-specific identifier 435 as the input to the cryptographic function 440.

The device 420 then sends (e.g., through a keychain manager 450) a request to join the synchronization group to the synchronization group 460. Further details for the keychain manager are provided in Sections II and III, below. The request to join includes the public key 405 and the device synchronization group identifier 445 of the device. In some embodiments any of the devices 470-475 that are already in the synchronization group 460 can authorize device 420 to join the synchronization group 460. In other embodiments, all member devices have to authorize a new device to join the group. In some embodiments, the device synchronization group identifier 445 is used to sign the public key 405 of the device.

Figure 5:
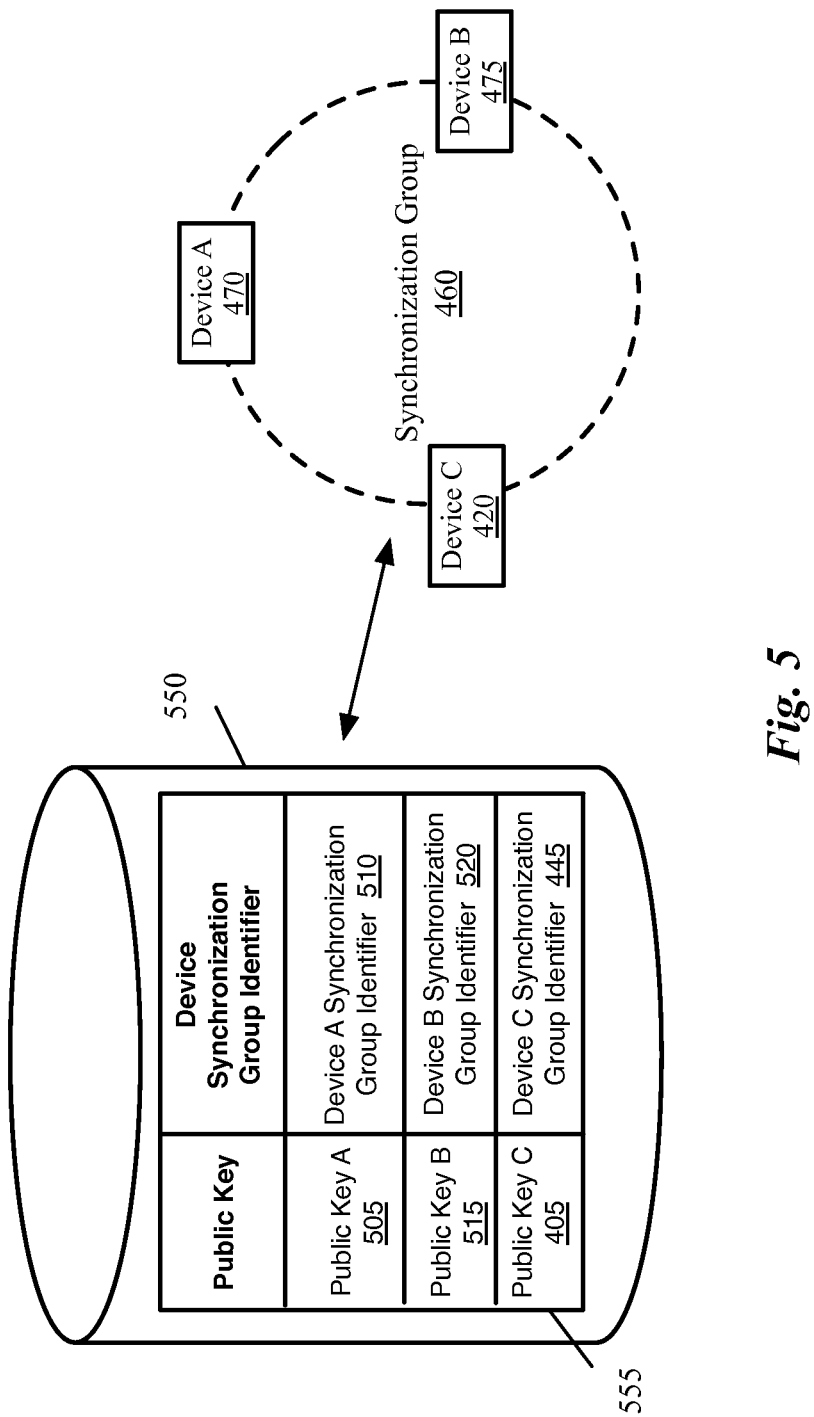
FIG. 5 conceptually illustrates the data stored (e.g., in a storage device in a cloud storage service and/or in the storage of each synchronization group member) in the synchronization group in some embodiments of the invention.

FIG. 5 conceptually illustrates the data stored (e.g., in a storage device in a cloud storage service and/or in the storage of each synchronization group member) in the synchronization group in some embodiments of the invention. As shown the storage 550 includes a structure such as table 555 that stores the public keys 508, 515, and 405 and device synchronization group identifiers 510, 520, and 445 of the members of the synchronization group 460.

Figure 6:
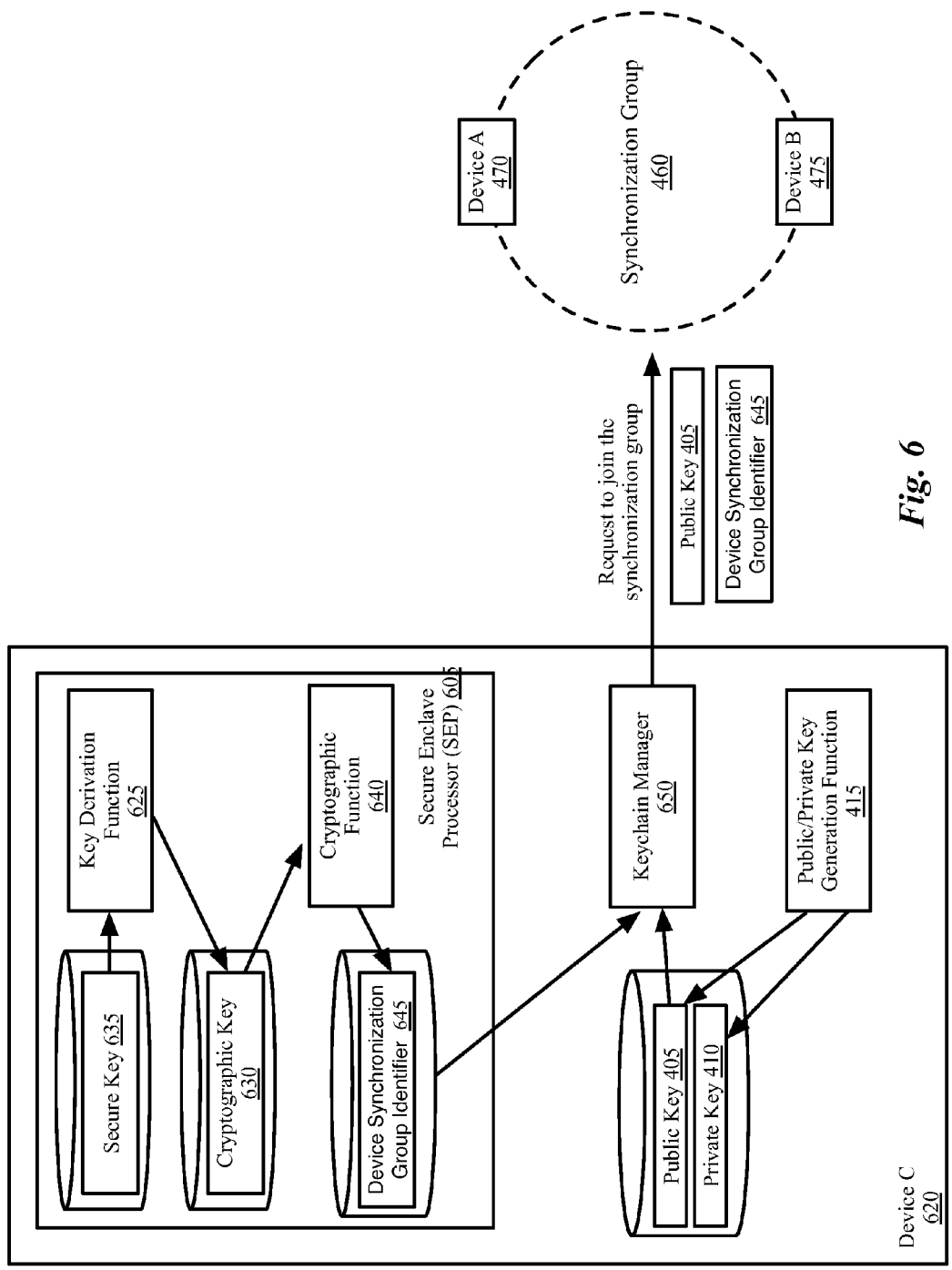
FIG. 6 conceptually illustrates an alternative embodiment for generating the device synchronization group identifier using a secure processor embedded in a device.

FIG. 6 conceptually illustrates an alternative embodiment for generating the device synchronization group identifier using a secure processor embedded in a device. As shown, the device 620 includes an embedded secure processor 605. An example of such secure processor is a secure enclave processor (SEP) that is used to secure confidential data of a device. The SEP in some embodiments includes a processor and one or more security peripherals. The SEP in some embodiments is isolated from the rest of the device (e.g., from one or more central processing units (CPUs) or application processors (APs) in the device). Access to the SEP in some embodiments is strictly controlled by hardware. For instance, some embodiments provide a mechanism in which the CPUs/APs can only access a mailbox location in the SEP. The CPUs/APs write a message to the mailbox, which the SEP reads and responds to. The SEP includes one or more of the following in some embodiments: secure key management, SEP control of boot and/or power management, and separate trust zones in memory.

Similar to device 420 in FIG. 4, device 620 generates a public Key 405 and private key 410 using a public/private key generation function 415 such as an RSA algorithm, an elliptic curve cryptography (ECC) algorithm, etc. In some embodiments a new public/private key pair is generated when the existing public/private key pair is deliberately erased or when the device hard drive is replaced without restoring the contents from a backup.

The secure embedded processor 620 includes a secure key 635 that is persistent after the device is rest, the device is reconfigured, or the hard drive of the device erased. The secure embedded processor 620 uses a key derivation function 625 to generate a cryptographic key 630 from secure key 635. A cryptographic function 640 such as a hash-based cryptographic function is used to generate a device synchronization group identifier 645 from the cryptographic key 630. In some embodiments, the SEP use other techniques to provide the input to the cryptographic function 640. For instance, some embodiments do not utilize a key derivation function 625 and directly provide the device-specific identifier 635 as the input to the cryptographic function 640.

When the device is going to join the synchronization group, the keychain manager 650 requests from the secure processor 605 and receives the device synchronization group identifier 645. The keychain manager 650 then sends a request to join the synchronization group to the synchronization group 460. The request to join includes the public key 405 and the device synchronization group identifier code 645 of the device. In some embodiments any of the devices 470-475 that are already in the synchronization group 460 can authorize device 620 to join the synchronization group 460. In other embodiments, all member devices have to authorize a new device to join the group. In some embodiments, the device synchronization group identifier 645 is used to sign the public key 405 of the device.

As described above by reference to FIG. 2, once a device that is a member of the synchronization group loses the public key that was used to join the synchronization group the device has to rejoin the synchronization group by using a new public key. In prior art, the previous public key of the device remains in the synchronization group storage and the synchronization group members still consider the non-participant (or invalid member) device with the previous public key as a member of the synchronization group and try to synchronize data items with the non-participant member.

Figure 7:
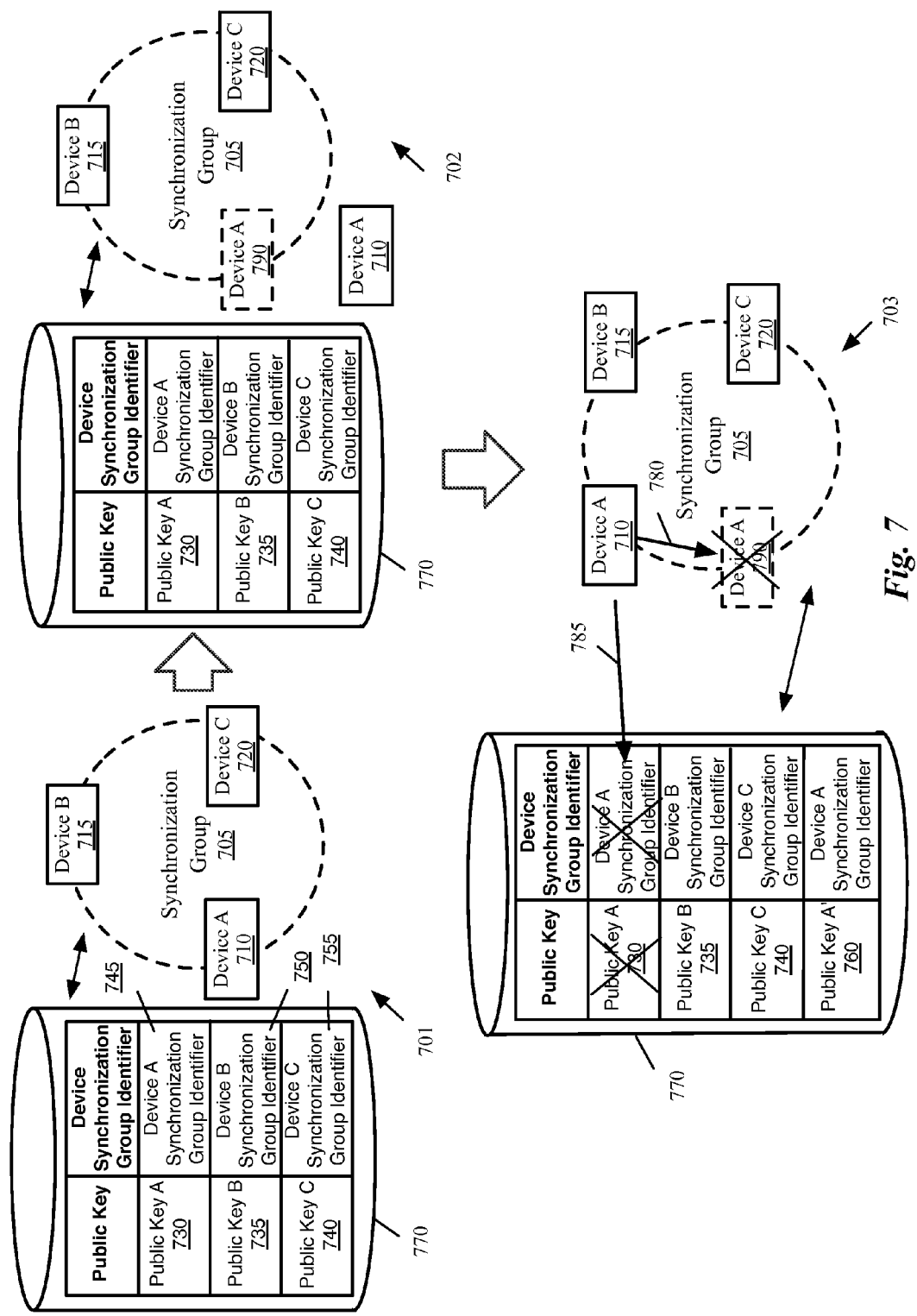
FIG. 7 conceptually illustrates a synchronization group in which a new member detects a previous public key associated with a non-participant member as its own and retires the public key and the associated non-participant member from the group.

FIG. 7 conceptually illustrates a synchronization group in which a new member detects a previous public key associated with a non-participant member as its own and retires the public key and the associated non-participant member from the group. The figure is shown in three stages 701-703. In stage 701, devices 710-720 are members of the synchronization group 705. The public keys 730-740 and device synchronization group identifiers 745-750 of the member devices 710-720 are stored in storage 770.

In stage 702, the public key of device A 710 is erased from the device's storage. For instance, the device is reconfigured without restoring from a backup, or the public key is expressly deleted from the device. As a result, device 710 cannot use the old public key to participate in the synchronization group. However, a copy 730 of the public key and a copy 735 of the device synchronization group identifier of the device 710 are still stored in storage 770. Other members 715-720 of the synchronization group 705 still consider a member 790 in the group with public key 730 and device synchronization group identifier 745. This member 730, however, is a non-participant or invalid member since the public key 730 is no longer accessible to the actual device 710.

In stage 703, device 710 rejoins the synchronization group with a new public key 760. Since the device uses (as described above by reference to FIGS. 4-6) a device-specific identifier that does not change each time the device is reconfigured, hard drive is changed, and/or the public key of the device is erased, the device synchronization group identifier 745 of the device does not change. The new public key 760 and the device synchronization group identifier 745 are stored in the storage 770 as the information used to identify a new member of the synchronization group 705.

As conceptually shown by arrows 780 and 785 in stage 703, device A 710 determines that the device synchronization group identifier of another group member matches the device's synchronization group identifier. The device determines the other group member as itself from a previous membership in the synchronization group. Since device A 710 no longer has a private key associated with public key 730, the device retires the non-participant member 730 from the synchronization group by removing the information (e.g., the public key 730) from storage 770 (or by informing the other members to remove the old public key from their storages).

Figure 8:
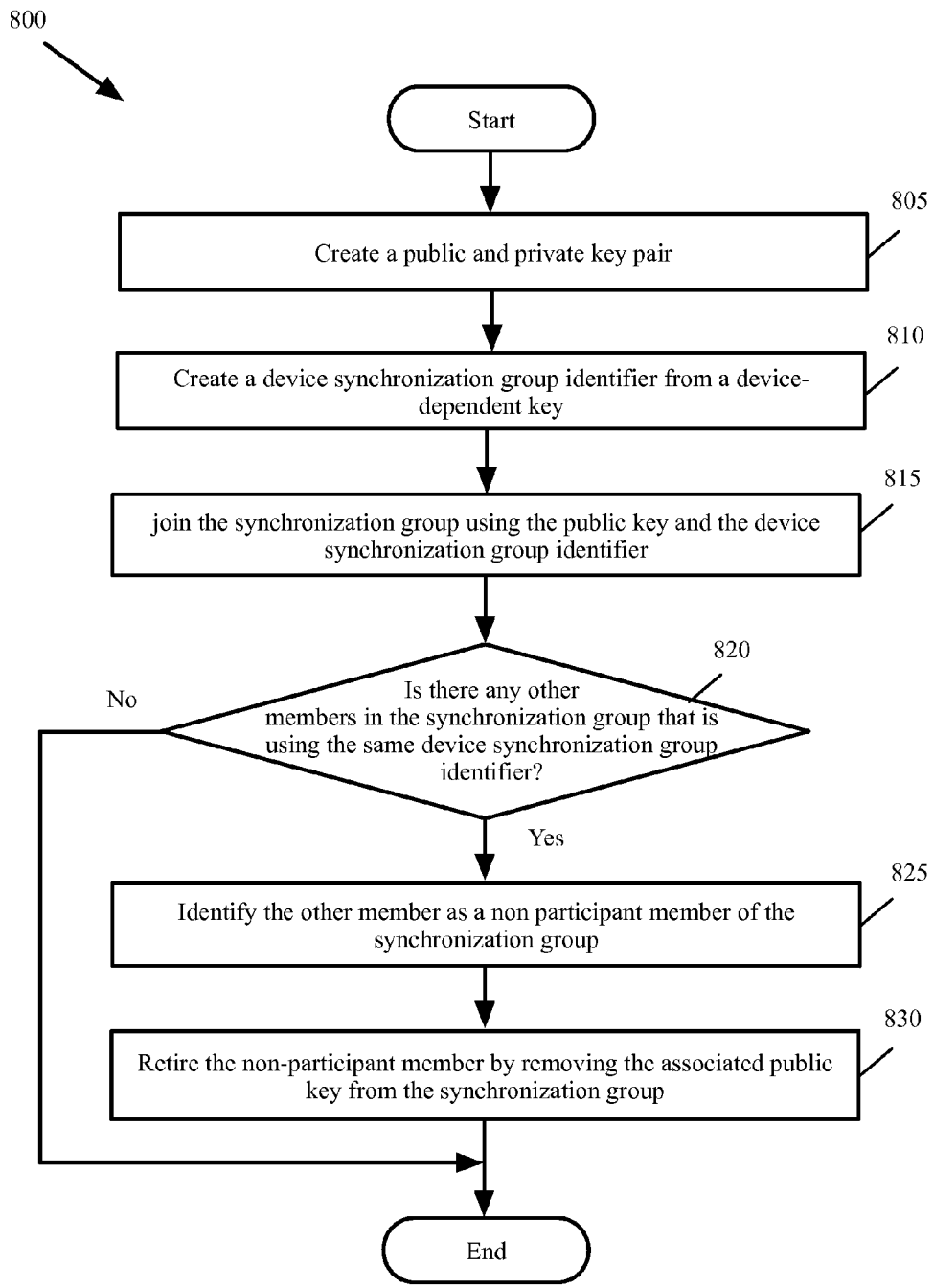
FIG. 8 conceptually illustrates a process for joining a device into a synchronization group and removing a non-participant member of the synchronization group in some embodiments of the invention.

FIG. 8 conceptually illustrates a process 800 for joining a device into a synchronization group and removing a non-participant member of the synchronization group in some embodiments of the invention. As shown, the process creates (at 805) a public and private key pair for the device. The process then creates (at 810) a device synchronization group identifier from a device-dependent key. For instance, the device uses any one of the methods described above by reference to FIGS. 4 and 6.

The process then joins (at 815) the synchronization group using the public key and the device synchronization group identifier. The process then determines (at 820) whether any other member in the synchronization group is using the same device synchronization group identifier. If not, the process ends. Otherwise, the process determines (at 825) that the other member is a non-participant (or invalid) member of the synchronization group. Since the device synchronization group identifiers are generated from a device-specific identifier and are unique for each device, the process determines that the other member is in fact the same device that had previously joined the synchronization group with a public key that is since been erased from the device.

The process then retires (at 830) the non-participant member by removing all information associated with the non-participant device including the old public key from the synchronization group storage. The process then ends.

II. Multiple Synchronization Groups

In the above examples, the user devices all participate in a single synchronization group. However, some embodiments define several synchronization sub-groups to synchronize different sets of keychain data, with devices only able to join a particular sub-group if the device meets the requirements for the sub-group. Specifically, some embodiments define verification sub-groups that devices may join if the devices satisfy membership requirements for the verification sub-groups, and use the verification sub-groups to define synchronization sub-groups in which the devices participate. Different synchronization sub-groups, in some embodiments, define different types of data items that the devices participating in the synchronization sub-groups share with each other via synchronization processes.

In some embodiments, the set of related electronic devices includes all devices that a user associates with a third-party service (e.g., with a particular cloud services account of the user). Knowledge of the cloud services account password serves as a requirement for membership in at least one of the verification sub-groups of some embodiments, while some embodiments define additional verification sub-groups that the various devices may join. Different embodiments define different sets of requirements for joining such additional verification sub-groups, including requirements that a device have a particular operating system, have a particular level of password strength, have a secure processor, or other device configuration properties. Some embodiments require that a device prove possession of a particular cryptographic secret in order to join a particular verification sub-group (e.g., possession of a key provided with an enterprise profile in order to join a verification sub-group defined by the enterprise), or that a user verify the membership of a new device on a device already established in the verification sub-group. In addition, some verification sub-groups may require that a new device verify a property of itself to an established device via an out-of-band process (e.g., by using a third party for verification).

Figure 9:
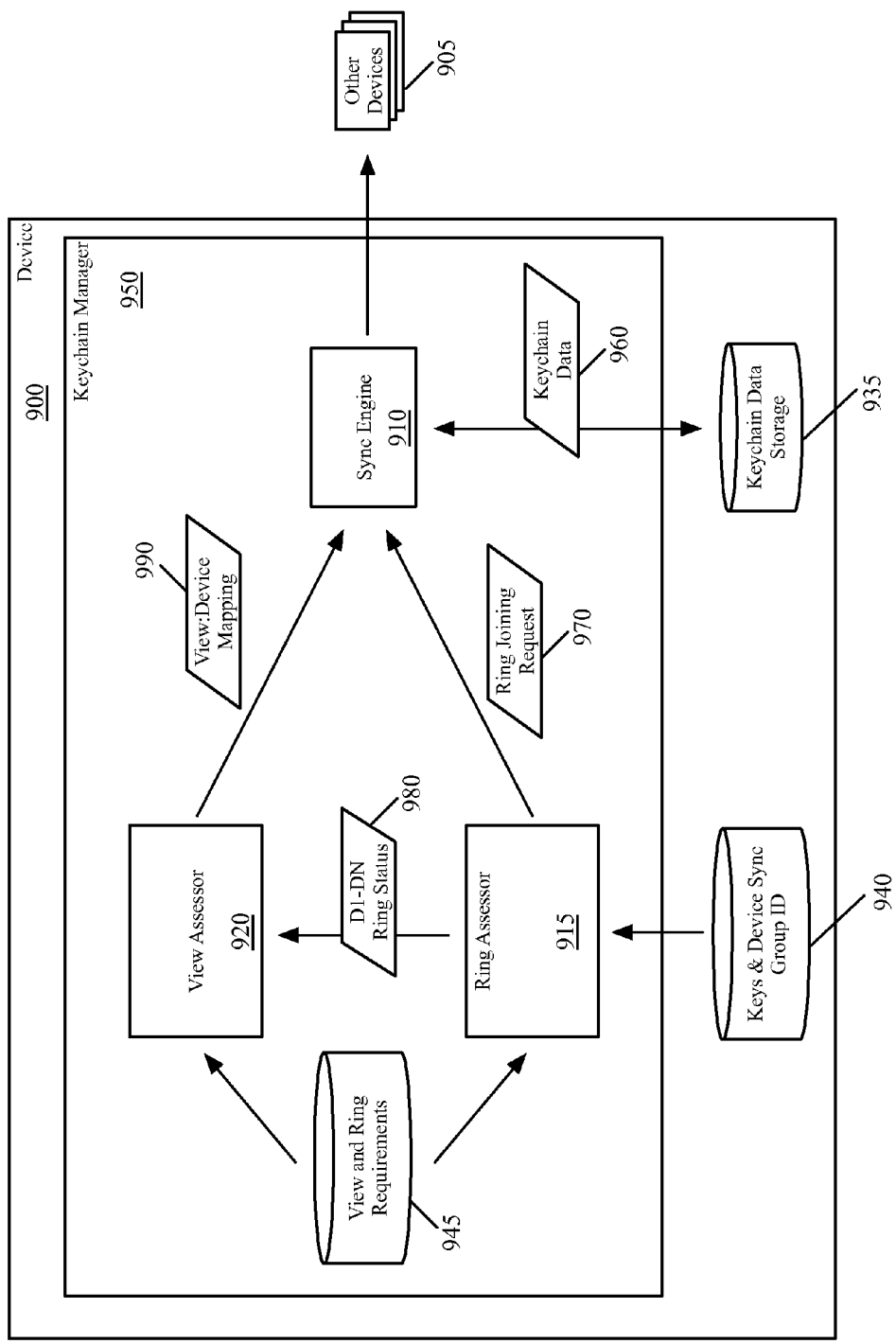
FIG. 9 conceptually illustrates the software architecture of a keychain manager of a device of some embodiments that supports such a system with multiple verification and synchronization sub-groups.

FIG. 9 conceptually illustrates the software architecture of a keychain manager 950 of a device 900 of some embodiments that supports such a system with multiple verification and synchronization sub-groups. In some embodiments, the keychain manager 950 performs the functions of the keychain managers 450 or 650 described above. These verification sub-groups are also referred to as rings and the synchronization sub-groups are also referred to as views. The device 900 is one of several devices associated with a cloud services account. For the discussion in this section, it will be assumed that the various devices joining rings and sharing data items through views are all associated with a single user (e.g., via a cloud services account or other user verification mechanism). Thus, in addition to the device 900, FIG. 9 illustrates a set of additional devices ($D_2$-$D_N$) 905. These devices may be any different type of electronic device that is capable of storing data and communicating with a network. For instance, these devices may include smartphones, tablets, laptop and/or desktop computers, smartwatches, set top boxes (either separate from or integrated into a television), virtual devices operating on another device (e.g., virtual machines), etc.

As shown, the keychain manager 950 includes a synchronization engine 910, a ring assessor 915, and a view assessor 920. In addition, the keychain manager 950 includes view and ring requirements 945. The view and ring requirements might be modifiable data stored in a physical storage (e.g., a hard disk, solid state memory, random access memory, etc.) in some embodiments, or embedded into the code of the modules. For example, if the view requirements are fixed, this information might be part of the view assessor, rather than separate data pulled from storage by these modules.

In addition, the device 900 includes a keychain data storage 935 and a key and device ID storage 940. The keychain data storage 935 stores keychain data items, which are the data items synchronized between the device 900 and the other device 905 in some embodiments. These data items, in some embodiments, are stored on the device encrypted with the public key associated with the device (and are stored on the other devices encrypted with the public keys of those other devices). In addition, in some embodiments, each data item stored on the device is tagged as belonging to one or more views (according to a set of view requirements that define to which views data items belong.

The keys and device synchronization group ID storage 940, in some embodiments, stores various keys that the device uses for data storage, data synchronization, and ring membership joining/verification. For instance, this storage includes the public and private keys 405 and 410 as well as the device synchronization group identifier 445, in some embodiments. In some embodiments, the keys storage 940 may also store ring signing keys (e.g., a key generated from a shared user credential such as a cloud services account password, enterprise or other keys used to join various different rings) as well as keys for protecting the synchronization data items during transport between devices. In some embodiments, these keys may be stored in various different locations on the device 900, rather than in a single storage. For instance, some of the keys may be stored in a secure processor, separate from the standard operation of the device 900.

The view and ring requirements storage 945 conceptually stores the requirements for different rings, as defined by third party developers, the device manufacturer, or the user. These requirements may include the possession of various credentials and/or cryptographic keys (e.g., the shared user password or other credential, an enterprise key, etc.), the assertion of various device and/or application properties (e.g., passcode length, operating system, possession of a secure processor, application configuration, etc.), the out-of-band verification of various properties (e.g., operating system, device validity, etc.), or various user actions (e.g., the entering of a code shown on one device on another device, moving one device within the proximity of another device, taking a picture of one device with another device, etc.). The storage 945 also stores the view requirements, which in some embodiments identify which rings a particular device (i.e., device 900 or one of the other devices 905) must be a member of in order to participate in each different view. In addition, the storage 945 of some embodiments includes the view description, which identifies, for each view, which types of data items belong to the view. This view description may identify data items for a view based on various characteristics, including which application the data item is received from (e.g., passwords from the Wi-Fi application for a first view, passwords from a web browser application for a second view), to which World Wide Web domain a password relates (e.g., passwords from a comprehensive list of financial web domains being assigned to a specific view). In some embodiments, the view description simply specifies data items tagged as belonging to the particular view, and the user selects from a list of views when first entering the data item.

The ring assessor 915 (i) generates requests for the device 900 to join rings and (ii) assesses requests from the other devices 905 to join rings of which the device 900 is already a member. To generate requests, the ring assessor 915 of some embodiments uses the ring requirements to determine when the device 900 meets the membership criteria for a ring. The ring requirements may be part of the ring assessor code (e.g., if hard-coded by the device manufacturer) or retrieved from the storage 945 (e.g., if defined by the user of the device or by third-party developers). In some embodiments, the ring assessor 915 checks periodically to determine whether the device 900 has changed in such a way that it meets the requirements for a ring of which it is not yet a member, or no longer meets the requirements for a ring of which it is already a member. In other embodiments, the ring assessor 915 operates in an event-driven manner. That is, when the a device property (or other criteria that affect ring membership) changes, the ring assessor 915 is notified to determine whether the device's ring status should change.

When the ring assessor 915 identifies that the device meets the criteria for joining a new ring (other than any request-driven actions, such as a user approving ring membership or carrying a code from one of the devices 905 to the device 900 (or vice versa)), the ring assessor 915 generates and signs a ring joining request 970, using any keys required for the ring request (e.g., the device public key and device synchronization group identifier used as part of the device identity for the ring, the device private key and/or any ring-specific keys used to sign the request, etc.). In addition, the ring assessor 915 may also send notifications to the other devices when it determines that the device should no longer be a member of a particular ring.

The ring assessor 915 also verifies ring joining requests received from the other devices 905. As with the device 900, when one of the other devices determines that it meets the criteria for joining a ring, that device generates and sends a ring joining request to the other devices in the ring (each device, in some embodiments, stores a list of devices in each ring, including those of which it is not a member). When the device 900 receives such a request, the ring assessor 915 verifies whether the requesting device should be allowed into the ring that it is asking to join. This may entail verifying that the request is signed with the appropriate key(s), verifying that any out-of-band criteria have been met or performing the out-of-band checks (e.g., that the requesting device is a valid device, that a code generated on the device 900 has been properly entered on the requesting device, etc.), that the device has properly asserted its criteria for joining the ring, that the user of the device 900 has approved the requesting device, etc. When the ring joining request is verified, the ring assessor 915 sends out a ring status message (not shown) to the other devices 905 that are in the ring. The ring status message, in some embodiments, is a list of the devices in the ring, including the recently-added device. This serves to notify the requesting device that it has successfully joined the ring, as well as to notify the other devices that the device 900 has approved the membership of the requesting device (and therefore that they do not need to separately process the membership request). In some embodiments, this notification message is signed with a private key of a ring-specific key pair (e.g., the key that was used to sign the membership request).

The ring assessor 915 also keeps the view assessor 920 regularly apprised of the current ring status 980 of the device 900 as well as the other devices 905. In some embodiments, the view assessor 920 requests this information as needed from the ring assessor 915 (or from a storage to which the ring assessor stores this information). The view assessor 920 is responsible for determining which of the devices (including the device 900 and the other devices 905) participate in each of the different views defined for the group of devices. Specifically, in some embodiments, the view assessor determines (at any given point in time, based on the current ring membership status of all of the devices) a mapping between views and devices (i.e., for each device, in which views does the device participate; or for each view, which device participate). The view assessor 920 makes this determination based on the view requirements which, again, may either be coded in to the view assessor by the device manufacturer or be variable information generated by third-party developers and/or users in various different embodiments.

In some embodiments, the synchronization engine 910 is responsible for syncing the view-tagged keychain data items with other devices 905, as well as communicating the ring joining requests and notifications. The sync engine 910, in some embodiments, determines that it should synchronize data items with another device, and receives from the view assessor 920 the list 990 of views in which the particular other device participates, and any special channel requirements for each of the views. The synchronization engine 910 retrieves the view-tagged keychain data items 960 that belong to the correct views from the keychain data storage 935 and synchronizes these data items to the other device via the secure channel. In some embodiments, this entails removing the encryption on the keychain data items used during storage on the device and re-encrypting the keychain data items with a shared key used for the secure channel.

Thus, devices may belong to multiple rings (verification sub-groups) and participate in the synchronization process for multiple views (synchronization sub-groups). In some embodiments, the device group identifier and public key are used to join rings, and thus the devices (e.g., the ring assessors on the devices) monitor ring membership to determine whether duplicate devices are members (based on the duplicate device IDs with different public keys). When this is the case, the devices remove the old duplicate device from the ring membership, which will in turn remove that device from the views that require membership in that particular ring. The rings and views of some embodiments are described in greater detail in U.S. Provisional Patent Application 62/168,893, filed May 31, 2015, and the concurrently filed U.S. Application 14/872,013, now published as U.S. Patent Publication 2016/0349999, and entitled "Synchronization and Verification Groups Among Related Devices," which are incorporated herein by reference.

III. Peer-to-Peer Network Architectures

Some embodiments synchronize keychains between devices that are members of a synchronization group through a peer-to-peer (P2P) network. The P2P network of different embodiments are implemented using different network architectures in order to facilitate communication between the devices in the synchronization group. The following figures illustrate several examples of different implementations of P2P network architectures.

Figure 10:
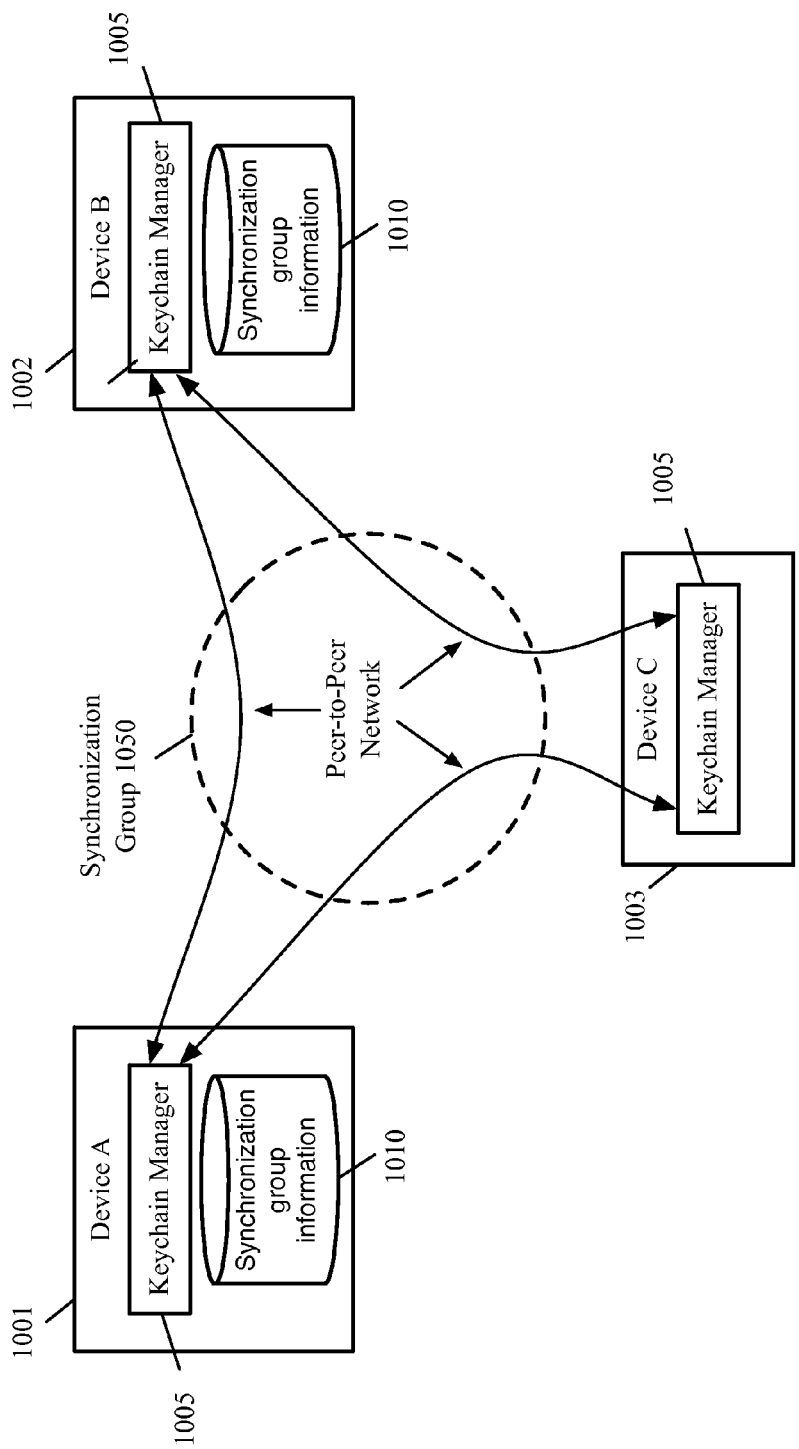
FIG. 10 conceptually illustrates a network architecture for a direct P2P network according to some embodiments of the invention.

FIG. 10 conceptually illustrates a network architecture for a direct P2P network according to some embodiments of the invention. In this example, devices A-C 1001-1003 are members of a synchronization group. As shown, each of the devices A-C includes storage 1010 for storing passwords and a keychain manager 1005. The keychain manager 1005 in some embodiments is responsible for performing the functions for facilitating the synchronization of keychain data between devices A-C.

A keychain, in some embodiments, is a defined collection of data. Examples of data items in a keychain include one or more of the following: private keys; certificates; secure notes; usernames, passwords, and/or account numbers for accessing websites, applications, networks, bank accounts, credit cards; other types of passwords and confidential information; information about a device's accounts such as electronic mail, contacts, calendar, and messages; and any other information that is desired to be shared among a set of different devices.

Figure 11:
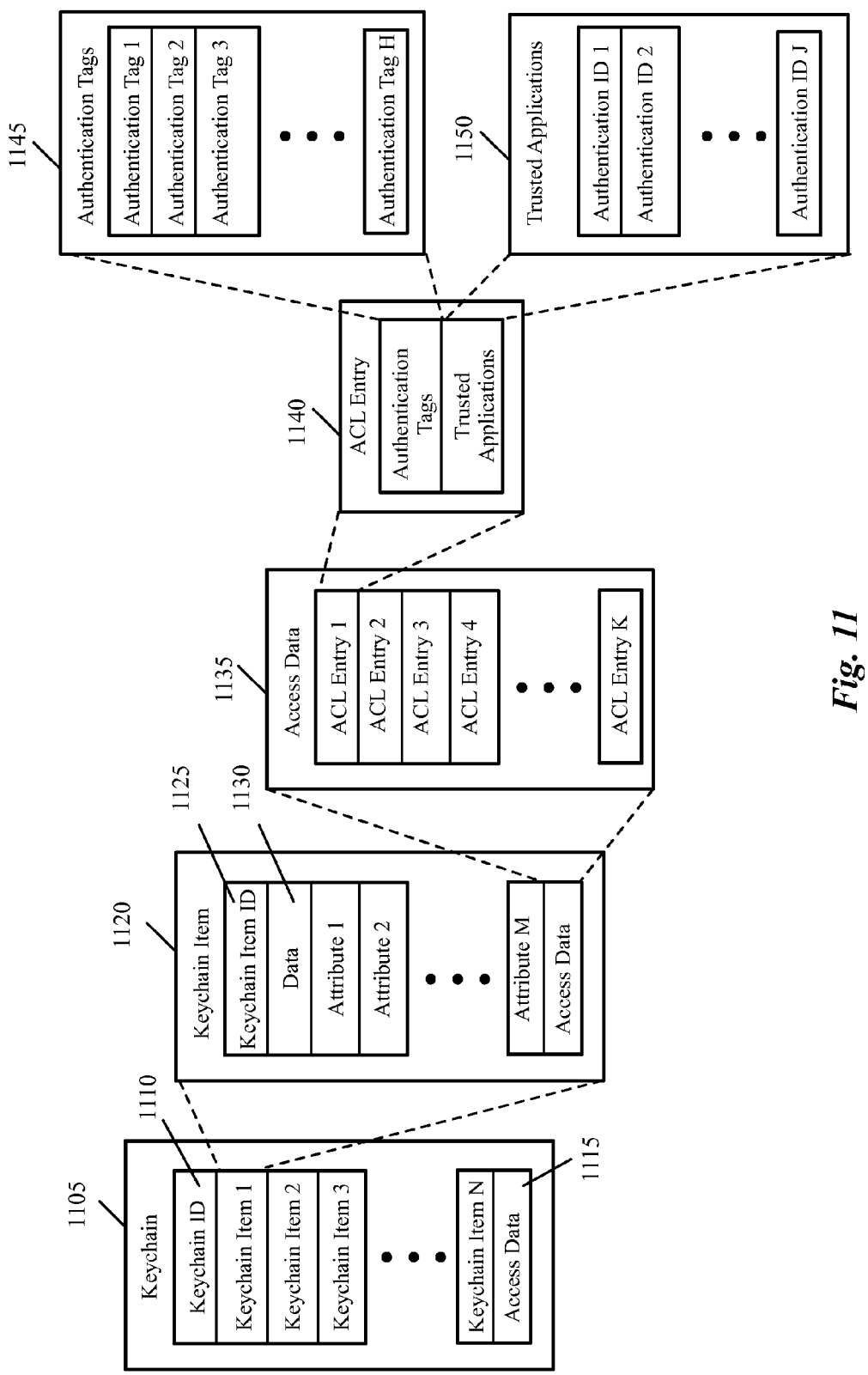
FIG. 11 conceptually illustrates a data structure for a keychain as stored by the keychain manager of some embodiments.

In some embodiments, the keychain manager generates and stores a data structure to represent a keychain. FIG. 11 conceptually illustrates a data structure 1105 for a keychain as stored by the keychain manager of some embodiments. As shown, the data structure 1105 includes a keychain identifier (ID) 1110, keychain items 1-N, and access data 1115. The keychain ID 1110 is a unique identifier for identifying the keychain 1105. The access data 1115 is for controlling access (e.g., what applications may access the keychain 1105 and/or what operations (e.g., read, write, delete, etc.) may be performed on the keychain 1105, etc.) to the keychain 1105 itself and is similar in structure to the access data 1135 described below.

As shown in FIG. 11, keychain item 1120 represents keychain item 1 of the keychain 1105. Keychain item 1120 includes a keychain item ID 1125, data 1130, attributes 1-M, an access data 1135 (also referred to as an access object). The keychain item ID 1125 is a unique identifier for identifying the keychain item 1120.

Data 1130 is the actual data value and/or values of the keychain item 1120. For instance, if the keychain 1120 represents a password, the data 1130 stores the value of the password (e.g., a string of alphanumeric characters). In some embodiments, the keychain manager encrypts the data of certain types of a keychain items (e.g., passwords, private keys, etc.) when the keychain manager stores the data. For the data of other types of keychain items (e.g., certificates), the keychain manager simply stores the data without encrypting the data.

Attributes 1-M of the keychain item 1120 are for storing metadata describing the keychain item 1120. Different types of keychain items have different sets of attributes. For example, Internet passwords have attributes that include attributes such as security domain, protocol type (e.g., hypertext transfer protocol (HTTP), hypertext transfer protocol secure (HTTPS), file transfer protocol (FTP), etc.), path (e.g., a uniform resource locator (URL) of an Internet resource), etc.

Each keychain item in some embodiments includes a date field attribute that indicates the time and date (also referred to as a timestamp) of the most recent modification to the keychain item. In some embodiments, each keychain item also includes an attribute for specifying that the keychain item is a keychain item that has been deleted (also referred to as a tombstone). When the attribute specifies that the keychain item is a tombstone, the keychain manager maintains the date field of the keychain item, but the keychain manager sets the value of the keychain items' data 1130 to null or empty. In some embodiments, a keychain item that resulted from a resolution of conflicting keychain items includes a set of attributes that includes (1) a flag indicating that the keychain item is the result of a conflict resolution, (2) a version number of the conflict resolver used to resolve the conflict, and (3) the conflicting keychain items from which the keychain item was resolved (also referred to as the parent keychain items). The set of attributes is referred to as the keychain item's conflict resolution metadata in some embodiments.

In some embodiments, the attributes or a subset of the attributes of a keychain item is used as a primary key for uniquely identifying the keychain item. That is, two keychain items with the same primary key are considered the same keychain item (regardless of whether the values of the data of the keychain items are the same).

The access data 1135 is for controlling access to the keychain item 1120. As illustrated, the access data 1135 includes access control list (ACL) entries 1-K for controlling access to the keychain item 1120. FIG. 11 illustrates an ACL entry 1140 that represents the ACL entry 1 of the access data 1135. The ACL entry 1140 includes authorization tags 1145 that specify operations (e.g., read, write, delete, decrypt, authenticate, etc.) that can be performed on the keychain item 1120. In this example, the authorization tags 1145 includes authorization tags 1-H.

Additionally, the ACL entry 1140 includes a list of trusted applications 1150. As shown, the list of trusted application 1150 includes application ID 1-J. Each application ID is a unique identifier for identifying a particular application that may perform the operations specified by the authorization tags 1145 without user authorization.

One of ordinary skill in the art will recognize that the keychain data structure 1150 is only one possible data structure that the keychain manager might use to store the required information for a keychain. For example, different embodiments might store additional or less information, store the information in a different order, etc.

Referring back to FIG. 10, the keychain manager 1005 in some embodiments handles the registration of the device into synchronization group, synchronizing passwords between devices in the group, resolving conflicts between conflicting passwords, and providing a secure communication channel for transporting data between devices A-C, etc.

As illustrated in FIG. 10, devices A-C communicate with each other through an overlay network with a fully connected mesh topology. As such, each of the devices A-C can directly communicate with each of the other devices. That is, device A can directly communicate with devices B and C, device B can directly communicate with devices A and C, and device C can directly communicate with devices A and B. As shown, a synchronization group 1050 is created using the P2P network and some or all devices 1001-1003 can join. In the example of FIG. 10, devices 1001 and 1002 have joined the synchronization group 1050 and maintain a data structure 1010 that is similar to data structures 550 and 770 described above to store the information (e.g., the public keys and device synchronization group identifiers) of the members of the synchronization group.

Some embodiments provide a secure transport layer to protect the data that devices communicate with each other. For this example, devices A-C communicate with each other through secure communication channels established between each pair of devices A-C. The secure communication channels may be implemented using any number of different protocols, such as message-based communication protocols (e.g., OTR messaging), stream-based communication protocols (e.g., SSL), etc.

In addition, each individual device uses the device's own public key and a public key of the user of the device to encrypt any data items that are stored on the device. In some embodiments, all devices in a synchronization group belong to the same user and the public key of the user of the device is the same in all devices.

Figure 12:
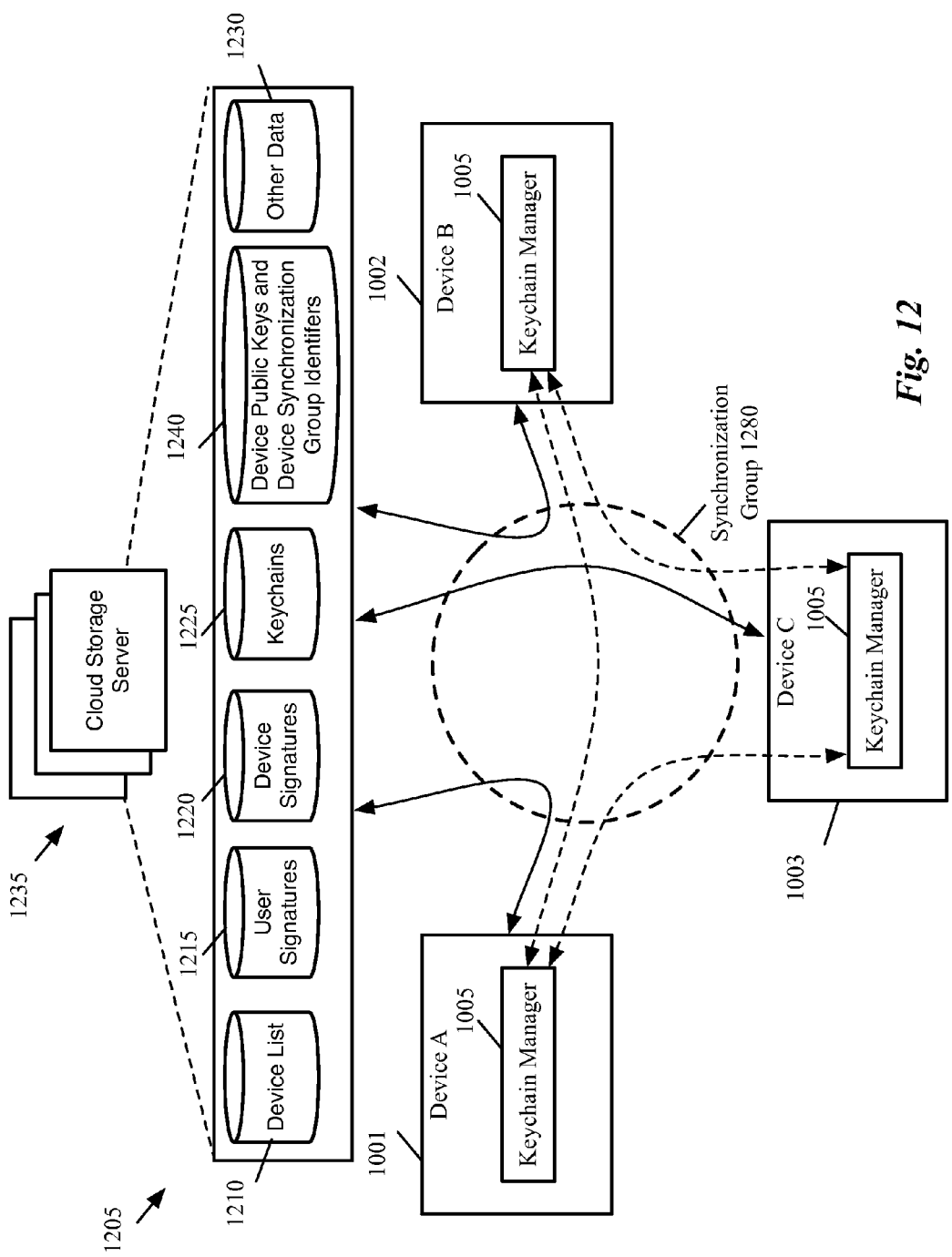
FIG. 12 conceptually illustrates a network architecture for an indirect P2P network according to some embodiments of the invention.

FIG. 12 conceptually illustrates a network architecture for an indirect P2P network according to some embodiments of the invention. In this example, devices A-C 1001-1003 are members of a synchronization group and each of the devices A-C includes the storage 1010 and the keychain manager 1005.

As shown in FIG. 12, devices A-C communicate with each other through an overlay network with a star topology. In particular, devices A-C communicate with each other through cloud services 1205, which serves as the center of the star topology and provides a cloud storage service for storing data as well as other cloud services (e.g., cloud computing services). For instance, when device A wishes to communicate data to device B, device A stores the data in the cloud services 1205, the cloud services 1205 notifies (e.g., via a push notification service) device B about the data, and device B retrieves the data from the cloud services 1205. The set of cloud servers 1235 in some embodiments control storages 1210-1230 of the cloud services as well as providing computing services.

As illustrated, the cloud services 1205 includes a group of cloud storage servers 1235. The cloud service may include one or more other servers such as application servers, network servers, etc., which are not shown for simplicity. As shown, the cloud storage servers 1235 include one or more storages 1210-1230. One of ordinary skill in the art will recognize that storages shown in FIG. 12 are only examples of the storages provided by a cloud service.

As shown, a synchronization group 1280 is created using the P2P network and some or all devices 1001-1003 can join. In the example of FIG. 12, the cloud service stores the information regarding the synchronization group. In other embodiments, in addition or as an alternative, each individual device that is a member of the synchronization group stores the information regarding the synchronization group. FIG. 12 shows the embodiments in which the cloud service stores the synchronization information. The embodiments that store the information in each member device maintain similar exemplary information in each individual device.

As shown, the cloud services in some embodiments stores a name for a synchronization group and a synchronization group device list in storage 1210 that specifies the devices that are members of the synchronization group. In some embodiments, the devices are specified by data uniquely identifying the devices. Examples of such data include a public key of a device signing public/private key pair for authenticating the identity of a device, a device type of the device (e.g., a desktop computer, a tablet, a smartphone, etc.), a name of the device, etc., or a combination of any number of such data.

The cloud services 1205 also stores user signatures in storage 1215. A user signature in some embodiments is a digital signature for authenticating the identity of a user as the signer of a message, document, or any other type of data. In some embodiments, the synchronization group is linked to a cloud services account and devices associated with the cloud services account (e.g., devices that have an application or program for accessing the cloud services associated with the account) are candidates for registering into the synchronization group. The storage 1215 in some such embodiments includes signatures signed with a private key of a user signing public/private key pair generated based on a password of the cloud services account to indicate that the user of the cloud services account is the signer. Examples of user signatures that are stored in the storage 1215 include a signature of the synchronization group device list signed with a private key of a user signing public/private key pair, signatures of registration requests signed with the private key of the user signing key pair, and/or any other signatures for authenticating the identity of the user of the cloud services account.

FIG. 12 also shows that the cloud services 1205 stores device signatures in storage 1220. In some embodiments, a device signature is a digital signature for authenticating the identity of a device in the synchronization group as the signer of a message, document, or any other type of data. For example, in some embodiments, the storage 1220 includes signatures of the synchronization group device list signed with a private key of a device signing public/private key pair that belongs to a device that is a member of the synchronization group. Such a signature indicates that the signing device affirms the list of devices in the synchronization group device list as the members of the synchronization group. In some embodiments, when the synchronization group is in a steady state (e.g., no registration requests are pending nor unapproved), the device signatures in the storage 1220 includes for each device that is a member of the synchronization group a signature of the synchronization group device list signed with a private key of the device's device signing public/private key pair. That is, the signatures in such instances collectively indicate that every device listed in the synchronization group device list agrees that the devices listed in the synchronization group device list are the members of the synchronization group.

In some embodiments, the cloud services 1205 stores the device public keys and device synchronization group identifiers in a storage 1240 similar to storages 550 and 770 described above. In addition, the cloud services 1205 stores keychain data in storage 1225 for synchronizing keychains between the devices in the synchronization group, and other data in storage 1230 that may include a public key of a user signing public/private key pair, a random string (e.g., a 256-bit string) shared between the devices in the synchronization group for generating the user signing key pair, and a list of pending registration requests. In some embodiments, the cloud services 1205 implements the storages 1210-1240 as key-value stores.

While the storages 1210-1240 are illustrated in FIG. 12 as separate storages, in some embodiments, the storages 1210-1240 are implemented as a single storage, while, in other embodiments, the storages 1210-1240 are implemented across several storages.

In some embodiments, the secure transport layer described above by reference to FIG. 10 is utilized to protect the data that devices communicate with each other through the cloud services 1205. That is, while devices A-C communicate with each other through secure communication channels established between each pair of devices A-C, the devices A-C use the cloud services 1205 as a mechanism for transporting the communications. The secure communication channels of some embodiments may be implemented in some embodiments using any number of different protocols (e.g., message-based communication protocols (e.g., OTR messaging), stream-based communication protocols (e.g., SSL), etc.).

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
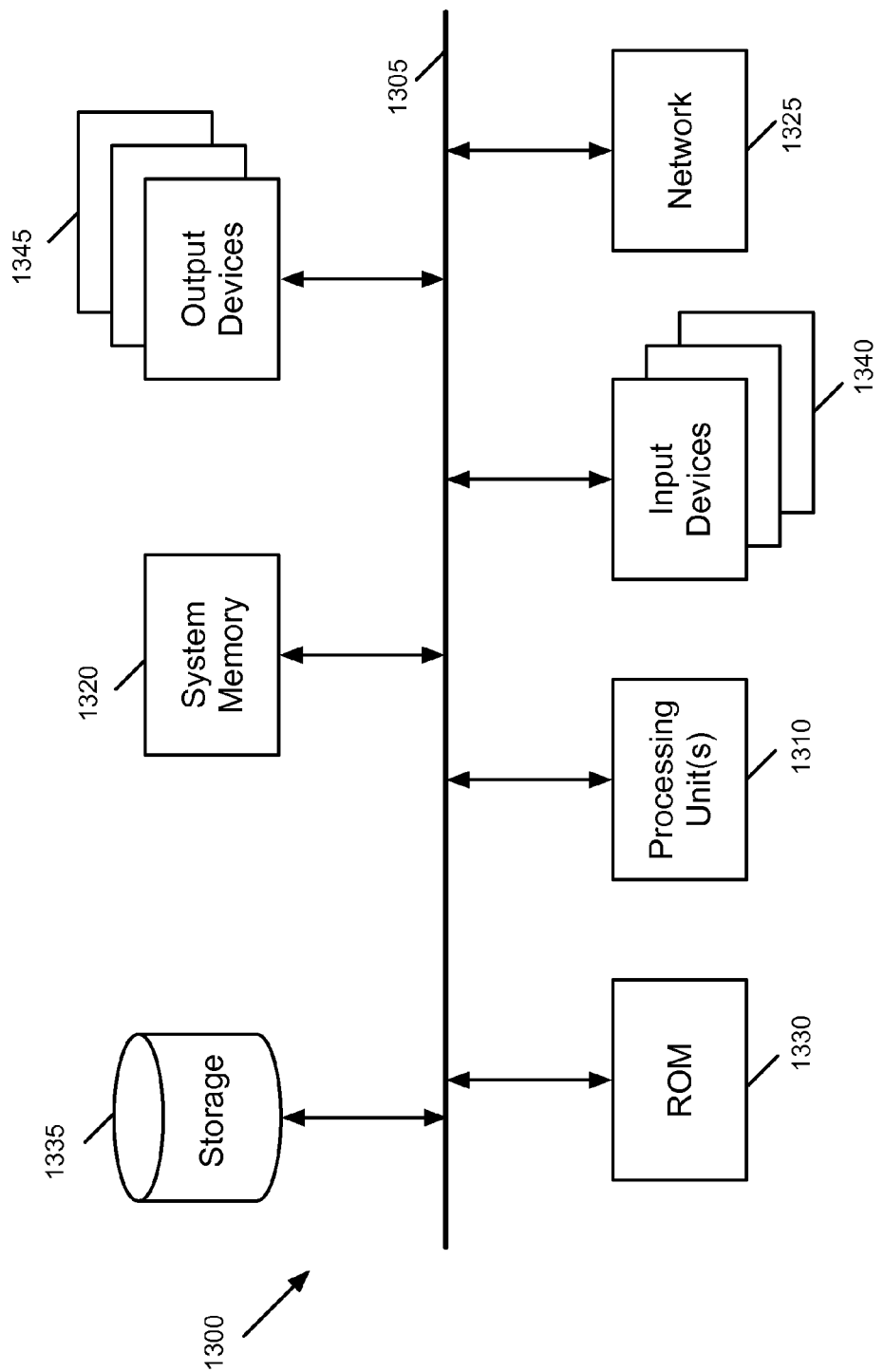
FIG. 13 conceptually illustrates another example of an electronic system with which some embodiments of the invention are implemented.

FIG. 13 conceptually illustrates another example of an electronic system 1300 with which some embodiments of the invention are implemented. The electronic system 1300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1300 includes a bus 1305, processing unit(s) 1310, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1320, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive, integrated flash memory) as the permanent storage device 1335.

Other embodiments use a removable storage device (such as a floppy disk, flash memory device, etc., and its corresponding drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor needs at runtime. In some embodiments, the invention's processes are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1105 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet), or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures such as FIG. 8 conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a program which when executed by at least one processing unit of a first peer device identifies an invalid device in a synchronization group that comprises a set of peer devices that synchronize data with each other, the program comprising sets of instructions for:
   generating a first synchronization group device identifier from a device-specific identifier of the first peer device;
   joining the first peer device in the synchronization group using the first synchronization group device identifier, wherein the synchronization group stores synchronization group device identifiers of each of the peer devices of the set of peer devices of the synchronization group, wherein each peer device in the set of peer devices has access to the stored synchronization group device identifiers of the set of peer devices;
   determining that a second synchronization group device identifier in the set of synchronization group device identifiers is the same as the first synchronization group device identifier; and
   based on the determination, removing a second device associated with the second synchronization group device identifier from the synchronization group.

2. The non-transitory machine readable medium of claim 1, wherein the set of instructions for generating the first synchronization group device identifier comprises sets of instructions for:
   deriving a cryptographic key from the device-specific identifier of the first peer device using a key derivation function; and
   generating the synchronization group device identifier of the first peer device from the derived cryptographic key.

3. The non-transitory machine readable medium of claim 1, wherein the device-specific identifier is a persistent hardware identifier of the first peer device.

4. The non-transitory machine readable medium of claim 1, wherein the set of instructions for generating the first synchronization group device identifier comprises a set of instructions for using a hash-based cryptographic function to generate the first synchronization group device identifier.

5. The non-transitory machine readable medium of claim 1, wherein the program further comprises a set of instructions for removing information stored in the synchronization group for the removed second device.

6. The non-transitory machine readable medium of claim 1, wherein the device-specific identifier of the first peer device is for tracking one of (i) an owner of the first peer device and (ii) an account associated with the first peer device, wherein the synchronization group device identifier cannot be used to track an owner of the first peer device or an account associated with the first peer device.

7. The non-transitory machine readable medium of claim 1, wherein the second synchronization group device identifier is a synchronization group device identifier previously used by the first peer device to join the synchronization group.

8. The non-transitory machine readable medium of claim 1, wherein the synchronization group device identifier is a message authentication code.

9. A method of identifying an invalid device in a synchronization group that comprises a set of peer devices that synchronize data with each other, the method comprising:
   generating a first synchronization group device identifier from a device-specific identifier of the first peer device;
   joining the first peer device in the synchronization group using the first synchronization group device identifier, wherein the synchronization group stores synchronization group device identifiers of each of the peer devices of the set of peer devices of the synchronization group, wherein each peer device in the set of peer devices has access to the stored synchronization group device identifiers of the set of peer devices;
   determining that a second synchronization group device identifier in the set of synchronization group device identifiers is the same as the first synchronization group device identifier; and
   based on the determination, removing a second device associated with the second synchronization group device identifier from the synchronization group.

10. The method of claim 9, wherein generating the synchronization group device identifier comprises:
    deriving a cryptographic key from the device-specific identifier of the first peer device using a key derivation function; and
    generating the synchronization group device identifier of the first peer device from the derived cryptographic key.

11. The method of claim 9, wherein the device-specific identifier is a persistent hardware identifier of the first peer device.

12. The method of claim 9, wherein generating the first synchronization group device identifier comprises using a hash-based cryptographic function to generate the synchronization group device identifier.

13. The method of claim 9 further comprising removing information stored in the synchronization group for the removed second peer device.

14. The method of claim 9, wherein the device-specific identifier of the first peer device is for tracking one of (i) an owner of the first peer device and (ii) an account associated with the first peer device, wherein the first synchronization group device identifier cannot be used to track an owner of the first peer device or an account associated with the first peer device.

15. The method of claim 9, wherein the second synchronization group device identifier is a synchronization group device identifier previously used by the first peer device to join the synchronization group.

16. The method of claim 9, wherein the synchronization group device identifier is a message authentication code.

17. A first peer device comprising:
a set of processing units; and
a non-transitory machine readable medium storing a program which when executed by at least one processing unit of a first peer device identifies an invalid device in a synchronization group that comprises a set of peer devices that synchronize data with each other, the program comprising sets of instructions for:
generating a device synchronization group identifier for the first peer device from a device-specific identifier of the first peer device;
joining the first peer device in the synchronization group using the first synchronization group device identifier, wherein the synchronization group stores synchronization group device identifiers of each of the peer devices of the set of peer devices of the synchronization group, wherein each peer device in the set of peer devices has access to the stored synchronization group device identifiers of the set of peer devices;
determining that a second synchronization group device identifier in the set of synchronization group device identifiers is the same as the first synchronization group device identifier; and
based on the determination, removing a second peer device associated with the second synchronization group device identifier from the synchronization group.

18. The device of claim 17, wherein the set of instructions for generating the first synchronization group device identifier comprises sets of instructions for:

deriving a cryptographic key from the device-specific identifier of the first peer device using a key derivation function; and
generating the synchronization group device identifier of the first peer device from the derived cryptographic key.

19. The device of claim 17, wherein the device-specific identifier is a persistent hardware identifier of the first peer device.

20. The device of claim 17, wherein the set of instructions for generating the first synchronization group device identifier comprises a set of instructions for using a hash-based cryptographic function to generate the first synchronization group device identifier.

21. The device of claim 17, wherein the program further comprises a set of instructions for removing information stored in the synchronization group for the removed second device.

22. The device of claim 17, wherein the device-specific identifier of the first peer device is for tracking one of (i) an owner of the first peer device and an account associated with the first peer device, wherein the synchronization group device identifier cannot be used to track an owner of the first peer device or an account associated with the first peer device.

23. The device of claim 17, wherein the second synchronization group device identifier is a synchronization group device identifier previously used by the first peer device to join the synchronization group.

24. The device of claim 17, wherein the synchronization group device identifier is a message authentication code.

* * * * *